United States Patent

Protze et al.

[15] 3,688,615
[45] Sept. 5, 1972

[54] PIPE CUTTING DEVICE

[72] Inventors: Josef Protze; Max Leidl, both of Frankfurt/Main, Hanauer, Germany

[73] Assignee: Messer Griesheim GmbH, Frankfurt/Main, Germany

[22] Filed: Feb. 23, 1971

[21] Appl. No.: 118,116

[30] Foreign Application Priority Data

Feb. 27, 1970  Germany..........P 20 09 287.9

[52] U.S. Cl..........................82/70.2, 82/4 C, 90/12, 143/47, 143/157
[51] Int. Cl..............................B23b 3/04, B23b 3/22
[58] Field of Search...........82/70.2, 46, 4.3, 101, 72; 90/12; 143/157, 47

[56] References Cited

UNITED STATES PATENTS

| | | | |
|---|---|---|---|
| 2,159,287 | 5/1939 | Morgan | 82/4 C |
| 2,842,238 | 7/1958 | Shaw et al. | 82/4 C |
| 2,561,484 | 7/1951 | Shaw et al. | 82/4 C |
| 2,705,629 | 4/1955 | Miller | 266/23 |

FOREIGN PATENTS OR APPLICATIONS 1,286,384  2/1969  Germany

*Primary Examiner*—Harrison L. Hinson
*Attorney*—Connolly and Hutz

[57] ABSTRACT

A pipe cutting device is characterized by a continuous link chain which is stretched tightly about the pipe with guide lugs being bilaterally provided at the face side of the links. A rolling carriage is arranged between the lugs for traveling 360° around the pipe. The carriage is provided with suitable adjustable cutting or other operating means.

13 Claims, 8 Drawing Figures

PATENTED SEP 5 1972 3,688,615

PIPE CUTTING DEVICE

BACKGROUND OF INVENTION

This invention relates to a device for the cutting to predetermined lengths for grinding or polishing and/or for the welding of pipes, joined together at their front sides when the device operates by means of a separating or a grinding unit, which may be replaced by a welding unit.

With the customary separating and welding units, it is impossible under any circumstances to achieve a perfect circular cut without at least one adjustment. In addition, the known devices until now are very complicated, are enormously heavy, and in practice are in no way easily serviced. These devices may not at all be employed under any circumstances with respect to a varied pipe diameter or in tight space conditions, such as in a shaft, for example.

SUMMARY OF INVENTION

Because of the known disadvantages, the novel device was developed, which is characterized in that around the pipe of any desired diameter, there is placed a wide, continuously tensile link chain, proportioned in its length. The chain is provided with guide lugs bilaterally protruding inwards at the front side of the links whereon a rolling carriage is arranged with a mounted separating or welding unit for the unobstructed revolution of at least 360°.

The weight of the novel chain is so insignificant that the chain may be attached to an extremely large pipe by only one person. Similarly a suitable separating or welding unit approximately corresponds to the weight of a hand drill.

The novel device may therefore be utilized for pipes of all diameters, from such which are better to cut with a hand saw, and indeed in any situation, especially in such where the customary ones are not suitable.

In the drawings, the device for the cutting to length of pipes is illustrated in an exemplary manner.

THE DRAWINGS

DETAILED DESCRIPTION

Figures 5, 6, 7:
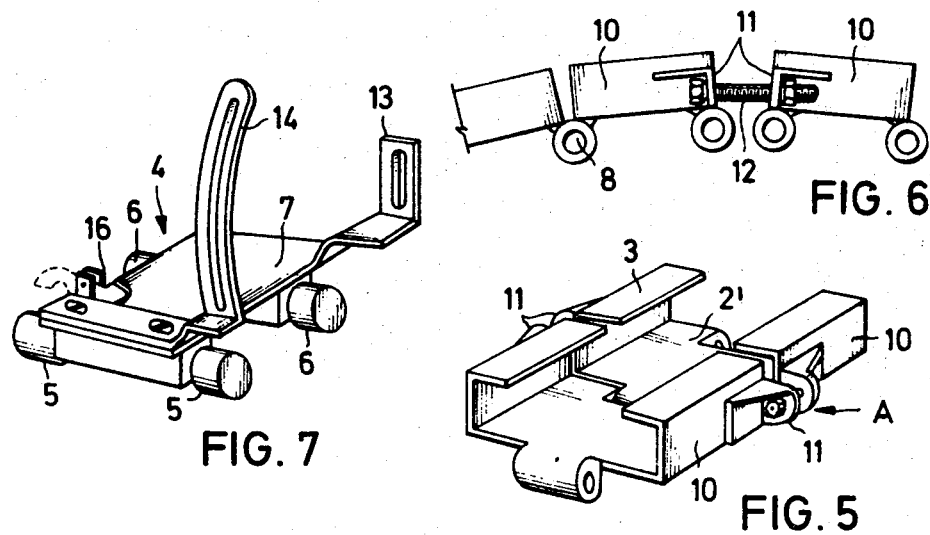
FIG. 5 is an illustration of a possible chain tensioning device.
FIG. 6 is a view taken through FIG. 5 in the direction of arrow A.
FIG. 7 is a perspective illustration of the carriage on which an operating unit such as a customary separating or welding apparatus may be supported swingably and movably in the chain around the pipe circumference.
Figure 8:
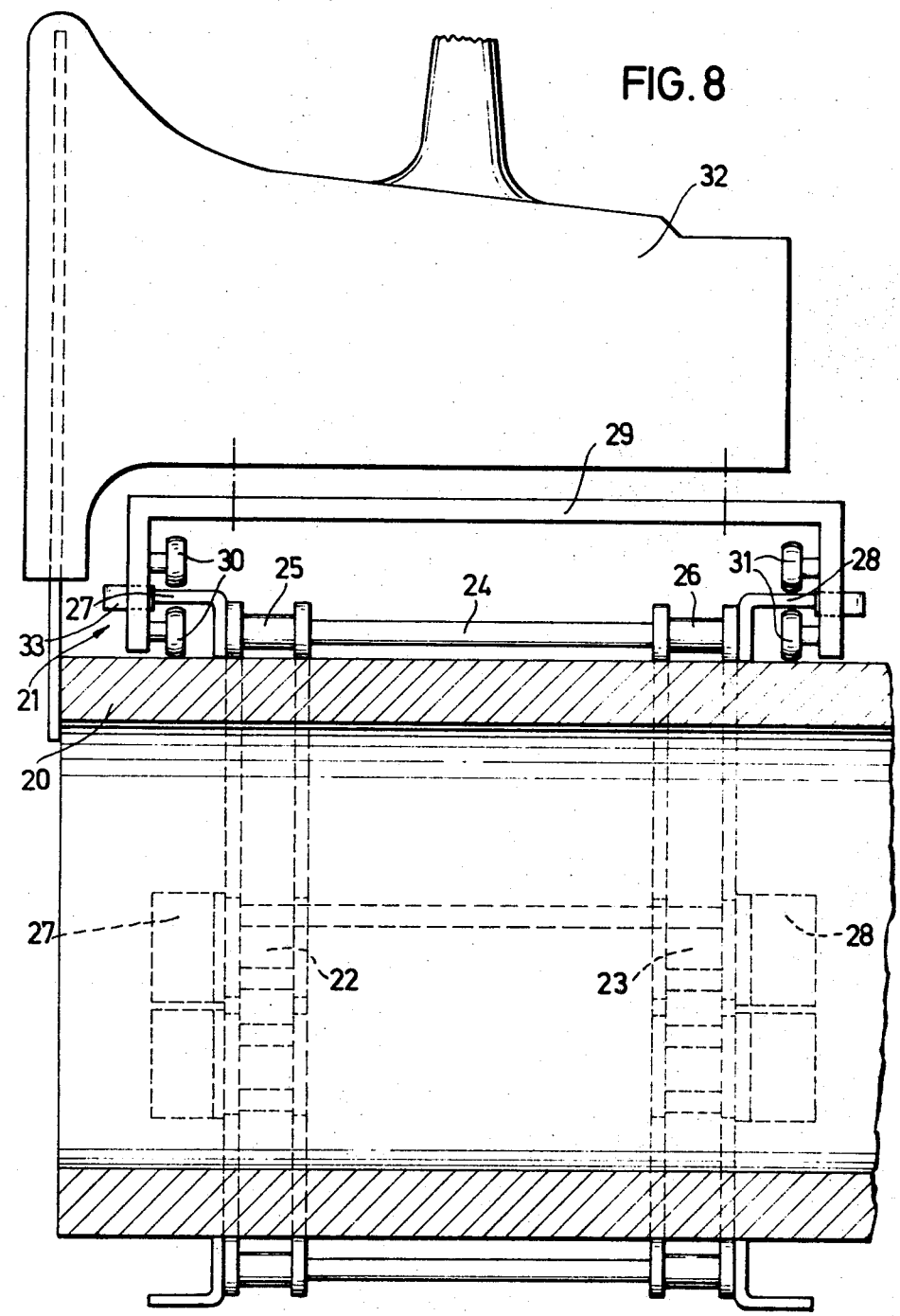
FIG. 8 is a cross-sectional view of still another form of this invention.

The main characteristic of the invention is the design of chain 1 or the link chain 21 of FIG. 8. Using a certain number of links 2 or 2', as shown for example in FIGS. 3 and 4, the chain may be stretched, exactly at a 90° angle to the pipe axis, continuously around each pipe 20 having any desired diameter. Due to the guideways or lugs 3, bilaterally provided at the front side of the individual links 2 or 2' and pointing downward, it is possible to movably guide a carriage 4. In this respect carriage 4 (as shown in FIG. 7) preferably has two pairs of rollers 5, 6 mounted at a distance from each other and has a support plate 7 upon which is provided holding devices 13 and 14. The roller pairs 5 and 6 as well as guideways 3 are dimensioned with respect to each other in height and distance in such a manner that with a tolerance or clearance allowing satisfactory movement while a still sufficiently precise guiding is afforded.

Figure 1:
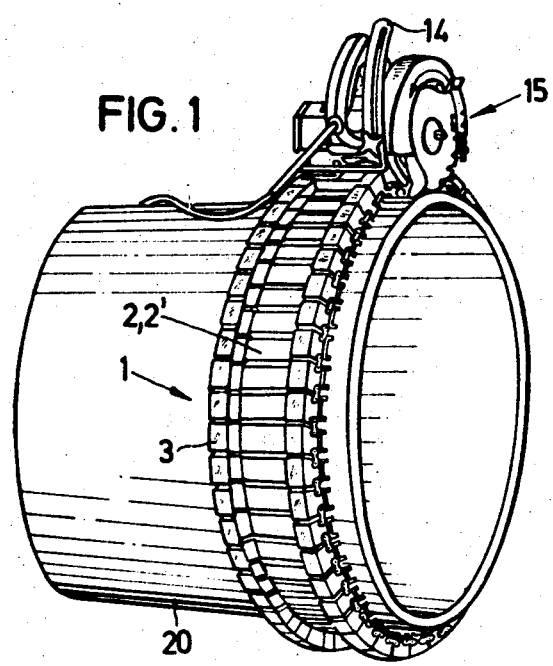
FIG. 1 is a device in a perspective view of a device of this invention in a mounted state.
Figure 2:
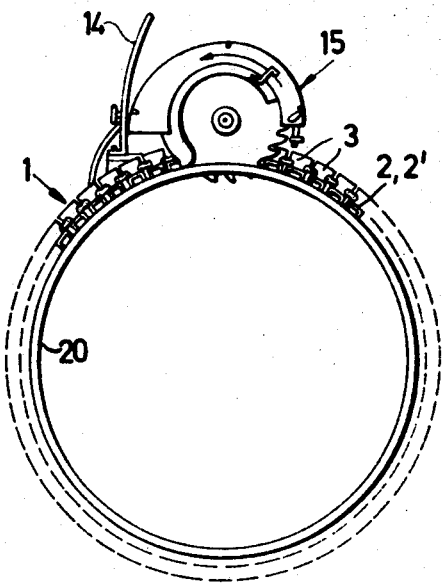
FIG. 2 is a side view of the novel device, also mounted on a pipe.
Figure 3:
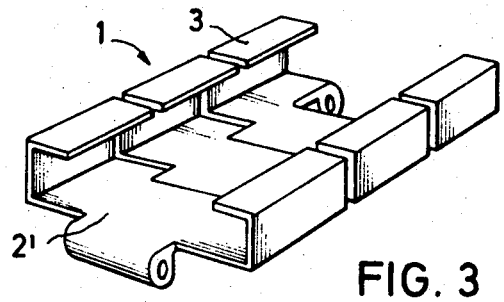
FIG. 3 is an exemplary embodiment of a chain, perspectively illustrated with only three links.
Figure 4:
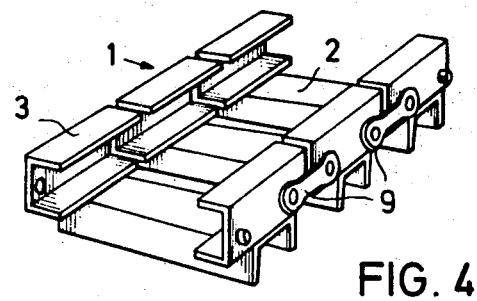
FIG. 4 is another embodiment of a chain in accordance with this invention.

The joining of the links 2 or 2' may be accomplished in any desired manner, as shown in FIGS. 3 and 4. In FIG. 3 the links 2' having mating tongues and recesses represent one form of link construction. Additionally for example, the links may also be connected by means of bolts 8 by interlocking the links, similar to tank treads, or by mounting of straps 9, which are movably riveted outside at the links at the frontal side. As shown in the drawings chain 1 may be constructed in any desired manner as long as the construction facilitates the carriage movement in an easily movable manner without any particular obstructions, hence not jerky in any way, whereby it is easy to move the carriage around a pipe to be processed. While the chain links 2 of FIG. 4 consist of customary, welded together sectional pieces, links 2' of FIG. 5 may also be prepared in the casting process. To each chain 1, regardless of the design, there are arranged two end links 10, which, constructed in mirror image to each other, have laterally arranged angle pieces 11 to make possible the tightening of the chain by means of screws 12. In order not to overload screws 12, the supporting areas, spherically constructed in a known manner, may be provided at the bolthead and nut.

The holding device 13 of FIG. 7 provided at carriage 4 serves the appropriate and swingable mounting of the separating or welding unit 15; and the holding device 14—in the shape of a bent wing—serves for the setting of the cutting depth. The separating or welding unit may without difficulty be moved by hand around the pipe. Holding devices 13, 14 thus provide a detachable mounting means whereby one type of operating unit may readily be replaced by another type of unit.

It is also possible in accordance with this invention to connect an advance drive arrangement with plate 7, whereby the movement is started electromechanically with the appropriate transmission. For the arresting of the separating or welding unit, there is swingably attached on plate 7 a catch 16 which is brought into action between the chain links 2, 2' or the guideways 3. In place of catch 16, there could also be provided a brake. With an appropriate design or dimensioning, chain 1 may also be made of synthetic material.

FIG. 8 illustrates a link chain 21 placed about pipe 20. The link chain 21 is formed by chains 22, 23 which are mounted at a certain distance by means of bolts 24.

At each of links 25, 26 there are attached guide lugs 27, 28. Between the guide lugs 27, 28 there is movably arranged a carriage 29, which has rollers 30, 31. For a lateral guidance of carriage 29, rollers 33 may be provided. On the carriage there may be set up a separating and cutting unit, schematically illustrated in the drawing and designated with 32.

What is claimed is:

1. A device for performing an operation on arcuate pipes characterized in a continuous link chain adapted to be stretched tightly about the pipe, guide lugs bilaterally provided at the face side of the links of said chain to provide a continuous 360° track around the pipe, a rolling carriage movably mounted in said track, and an operating united mounted on said carriage.

2. A device of claim 1, characterized in that the individual links of the link chain are held together laterally by straps.

3. A device of claim 1, characterized in that the link chain consists of links which are welded together at right angles to each other from pieces of U iron sections.

4. A device of claim 1, characterized in that the link chain consists of a number of links which are continuous in its entire length and correspond to the outside diameter of the pipe to be processed.

5. A device of claim 1, characterized in that the link chain is provided with two end links which have laterally mounted tension devices.

6. A device of claim 1, characterized in that the rolling carriage is provided with two pairs of rollers fitting into the guide lugs, said carriage having a plate whereon holding means mounted on said plate for a separating mounting an operating unit and an advance aggregate, and locking device on said plate in the form of an adjustable catch.

7. A device of claim 1, characterized in that the individual links of the link chain are held together by transversely situated bolts.

8. A device of claim 1, characterized in that the link chain consists of links which are cast from a light but solid material, the individual links being fitted together by mating tongues and recesses.

9. A device of claim 1, characterized in the carriage includes detachable mounting means for detachably mounting replaceable operating units.

10. A device of claim 9, characterized in that the detachable mounting means includes a plate, a slotted vertical flange mounted substantially perpendicular to the plate at one end thereof, and a bent slotted wing vertically mounted at the other end of the plate.

11. A device of claim 10, characterized in that the operating unit is a manually movable cutting apparatus adjustably secured to the flange and wing in accordance with the cutting depth.

12. A device of claim 1, characterized in that the link chain consists of a pair of spaced parallel chains interconnected to each other, and the carriage having pairs of rollers disposed above and below each guide lug.

13. A device of claim 12, characterized in that the chains are interconnected by bolts, and a further roller being provided on the carriage for the lateral guidance thereof.

* * * * *